United States Patent
Mochizuki

(10) Patent No.: US 9,625,919 B2
(45) Date of Patent: Apr. 18, 2017

(54) BED HEIGHT ADJUSTMENT SYSTEM FOR VEHICLE

(71) Applicant: Hino Motors, Ltd., Hino-shi (JP)

(72) Inventor: Takashi Mochizuki, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 14/761,858

(22) PCT Filed: Dec. 19, 2013

(86) PCT No.: PCT/JP2013/084098
§ 371 (c)(1),
(2) Date: Jul. 17, 2015

(87) PCT Pub. No.: WO2014/112283
PCT Pub. Date: Jul. 24, 2014

(65) Prior Publication Data
US 2015/0355646 A1   Dec. 10, 2015

(30) Foreign Application Priority Data

Jan. 18, 2013   (JP) .................. 2013-007540

(51) Int. Cl.
*B60P 1/16*   (2006.01)
*G05D 16/20*   (2006.01)
(Continued)

(52) U.S. Cl.
CPC ......... *G05D 16/2066* (2013.01); *B60G 11/27* (2013.01); *B60G 17/015* (2013.01);
(Continued)

(58) Field of Classification Search
CPC ..... B61D 9/02; B61D 7/28; B60P 1/20; B60P 1/34; B60P 1/14; B60P 1/18;
(Continued)

(56) References Cited

U.S. PATENT DOCUMENTS

| 4,400,131 A | * | 8/1983 | Blake ........................ B60P 1/16 |
| | | | 222/195 |
| 4,542,461 A | * | 9/1985 | Eldridge ................ G07C 5/085 |
| | | | 298/22 C |

(Continued)

FOREIGN PATENT DOCUMENTS

| JP | 63-85510 U | 6/1988 |
| JP | 5-58410 U | 8/1993 |

(Continued)

OTHER PUBLICATIONS

U.S. Appl. No. 14/761,848, filed Jul. 17, 2015, Mochizuki.

(Continued)

*Primary Examiner* — Glenn Dayoan
*Assistant Examiner* — Sunsurraye Westbrook
(74) *Attorney, Agent, or Firm* — Oblon, McClelland, Maier & Neustadt, L.L.P.

(57) ABSTRACT

A bed height adjustment system for adjusting height of a bed of a vehicle including an air spring supporting the bed; a valve unit connected to an air tank and configured to adjust height of the air spring by supplying and discharging air; and a vehicle-control ECU provided with a dump-signal line and a return-signal line each connected to the valve unit. The valve unit adjusts the height of the air spring into a dump mode by inputting a signal of the dump-signal line, returns the height of the air spring into a normal mode by inputting a signal of the return-signal line, and maintains the dump mode or the normal mode when the signal is not input.

6 Claims, 2 Drawing Sheets

(51) Int. Cl.
*G01P 3/50* (2006.01)
*B60G 17/015* (2006.01)
*B60G 17/017* (2006.01)
*B60G 17/052* (2006.01)
*B60G 11/27* (2006.01)
*B60P 1/04* (2006.01)
*B60P 1/02* (2006.01)

(52) U.S. Cl.
CPC ......... *B60G 17/017* (2013.01); *B60G 17/052* (2013.01); *B60P 1/027* (2013.01); *B60P 1/045* (2013.01); *B60P 1/16* (2013.01); *B60P 1/162* (2013.01); *G01P 3/50* (2013.01); *B60G 2300/02* (2013.01); *B60G 2300/04* (2013.01); *B60G 2300/38* (2013.01); *B60G 2400/60* (2013.01); *B60G 2500/201* (2013.01); *B60G 2500/202* (2013.01); *B60G 2500/30* (2013.01); *B60G 2600/20* (2013.01); *B60G 2600/204* (2013.01)

(58) Field of Classification Search
CPC ......... B60P 1/5428; B60P 1/56; B60P 1/6418; B65F 3/04; B65F 3/08
USPC .............. 298/22 C, 17 R, 22 R, 22 P, 11, 14; 414/555, 21, 469, 501, 332, 705; 296/101, 183.2, 98
See application file for complete search history.

(56) References Cited

U.S. PATENT DOCUMENTS

| | | | | |
|---|---|---|---|---|
| 8,033,614 | B2* | 10/2011 | Nabeshima | B60P 1/162 298/20 R |
| 8,328,291 | B2* | 12/2012 | Nakate | B60P 1/283 298/22 C |
| 8,702,061 | B2* | 4/2014 | Suzuki | E02F 9/18 212/270 |
| 2013/0285358 | A1* | 10/2013 | Lasser | B62D 25/188 280/848 |

FOREIGN PATENT DOCUMENTS

| | | |
|---|---|---|
| JP | 6-41241 A | 2/1994 |
| JP | 6-19363 Y2 | 5/1994 |
| JP | H 6-41241 B2 | 6/1994 |
| JP | 3767397 B2 | 4/2006 |
| JP | 3767410 B2 | 4/2006 |
| JP | 2011-68205 A | 4/2011 |

OTHER PUBLICATIONS

International Search Report issued Apr. 8, 2014 in PCT/JP2013/084098.
International Preliminary Report on Patentability and Written Opinion (English translation only).

* cited by examiner

BED HEIGHT ADJUSTMENT SYSTEM FOR VEHICLE

TECHNICAL FIELD

An aspect of the present invention relates to a bed height adjustment system for adjusting height of a bed of a vehicle.

BACKGROUND ART

Conventionally, as a vehicle-height adjustment device for adjusting a height of a vehicle, a device disclosed in Patent Literature 1 has been known. Patent Literature 1 describes a vehicle-height adjustment device that includes an air spring supporting a vehicle body, a leveling valve configured to adjust the vehicle height by supplying pressurized air to the air spring, and a cut valve configured to lower the vehicle height by releasing air when a passenger gets on or off the vehicle.

CITATION LIST

Patent Literature

[Patent Literature 1] Japanese Utility Model Application Laid-Open Publication No. 5-58410

SUMMARY OF INVENTION

Technical Problem

To control a conventional vehicle-height adjustment device, a relay is generally used. However, when a relay is used, there is a problem in that high-level control cannot be achieved easily, which requires a larger number of parts thereby resulting in increased production cost. Alternatively, if all of the related parts are electrically controlled to finely control the vehicle height, cost will significantly increase.

In a vehicle such as a dump truck including a bed, it is required to lower a height of the bed during loading the bed with a cargo. Furthermore, in a dump truck, a bed needs to be supported by an air spring to prevent a cargo from being damaged, but conversely the air spring may cause the bed to wobble during loading/unloading of a cargo. In such a case, stability can be increased by sufficiently releasing air of the air spring. Improvement to meet this requirement remains.

In view of this, an aspect of the present invention aims to provide a bed height adjustment system that enables cost reduction by using a vehicle-control electrical control unit (ECU) instead of a relay and also can improve convenience in loading/unloading of a cargo.

Solution to Problem

To solve the above-described problems, according to an aspect of the present invention, a bed height adjustment system for adjusting height of a bed of a vehicle includes: an air spring supporting the bed; a valve unit connected to an air tank and configured to adjust height of the air spring by supplying and discharging air; and a vehicle-control ECU provided with a dump-signal line and a return-signal line each connected to the valve unit. The valve unit adjusts the height of the air spring into a dump mode by inputting a signal of the dump-signal line, returns the height of the air spring into a normal mode by inputting a signal of the return-signal line, and maintains the dump mode or the normal mode when the signal is not input.

The bed height adjustment system according to an aspect of the present invention uses the vehicle-control ECU for control of height adjustment of the bed, thereby making it possible to achieve lower cost of the vehicle than in a case of providing a relay used exclusively for the control. In addition, this bed height adjustment system is configured to adjust the height of the air spring into two stages of the dump mode (mode in which the height is lower than in the normal mode) and the normal mode, which eliminates the load of complicated control on the vehicle-control ECU, thereby making it possible to reduce memory usage of the vehicle-control ECU. Thus, the bed height adjustment can be controlled by using unused memory of the current vehicle-control ECU without adding an expensive suspension electronic control ECU, leading to an advantage in cost reduction. Furthermore, because this bed height adjustment system maintains the height of the air spring in the dump mode or the normal mode when the signal is not input, loading/unloading of a cargo can be performed without returning automatically even when a driver pulls out the engine key. Thus, with this bed height adjustment system, because the driver can take a rest or do another operation after pulling out the engine key during loading/unloading of the cargo, convenience in loading/unloading of the cargo can be markedly improved.

In the bed height adjustment system according to an aspect of the present invention, the valve unit may include a magnetic valve connected to the air tank, and a discharge valve configured to adjust the height of the air spring into the dump mode by discharging air in the air spring during an open state of the magnetic valve. The magnetic valve may be connected to the dump-signal line and the return-signal line. The magnetic valve may switch into the open state by inputting the signal of the dump-signal line, switch into the closed state by inputting the signal of the return-signal line, and maintain the open state or the closed state when the signal is not input.

In the bed height adjustment system according to an aspect of the present invention, the discharge valve may be connected to the air tank and may be configured as a leveling valve for adjusting the height of the air spring by supplying and discharging air.

The bed height adjustment system according to an aspect of the present invention may further include a vehicle-speed sensor detecting vehicle speed of the vehicle, wherein the vehicle-control ECU may input a signal to the return-signal line when the vehicle speed is equal to or higher than a predetermined speed.

Advantageous Effects of Invention

The bed height adjustment system according to an aspect of the present invention enables cost reduction by using a vehicle-control ECU instead of a relay, and also can improve convenience in loading/unloading of a cargo.

DESCRIPTION OF EMBODIMENTS

Preferred embodiments of the present invention will be described hereinafter in detail with reference to the drawings.

Figure 1:
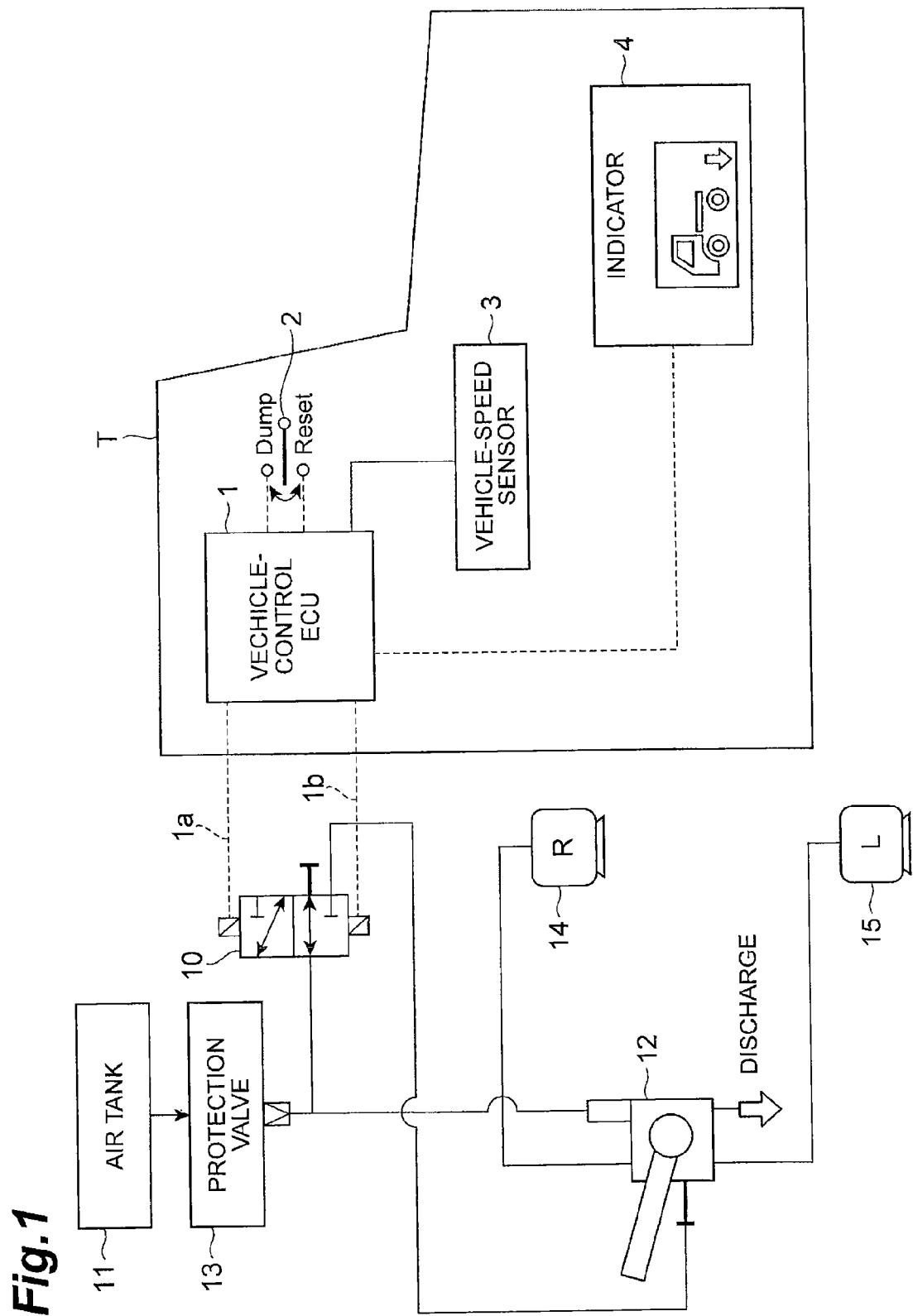
FIG. 1 is a schematic diagram illustrating one embodiment of a bed height adjustment system according to an aspect of the present invention.

As depicted in FIG. 1, a bed height adjustment system according to the present embodiment is a system included in a large dump track T to adjust the height of a bed of the dump truck T. This bed height adjustment system includes a vehicle-control ECU 1, a magnetic valve 10, an air tank 11, a leveling valve 12, a protection valve 13, and air springs 14 and 15.

The vehicle-control ECU 1 is an electronic control unit including a central processing unit (CPU), a read only memory (ROM), and a random access memory (RAM). The vehicle-control ECU 1 performs engine control of the dump truck T, and controls the height of the bed.

The vehicle-control ECU 1 includes a dump switch 2, a vehicle-speed sensor 3, and an indicator 4. The dump switch 2 is a switch configured to switch modes of the height of the bed.

The dump switch 2 is a momentary switch provided to a cab, and is switched into a dump-switch ON state or a reset-switch ON state when a driver keeps pressing the dump switch 2 for a predetermined time (e.g., about 1 second). The dump switch 2 transmits a dump-switch switching signal to the vehicle-control ECU 1 when the dump switch 2 is switched into the dump-switch ON state. The dump switch 2 transmits a reset-switch switching signal to the vehicle-control ECU 1 when the dump switch 2 is switched into the reset-switch ON state.

The vehicle-speed sensor 3 is a sensor provided to a transmission, for example, to detect the vehicle speed of the dump truck T. The vehicle-speed sensor 3 transmits a detected vehicle-speed signal to the vehicle-control ECU 1.

The indicator 4 is a display provided to an instrument panel in the cab to indicate that the bed is in a dump mode to the driver by illuminating. The indicator 4 illuminates by inputting a signal from the vehicle-control ECU 1.

The magnetic valve 10 is a valve that opens and closes by inputting a signal from the vehicle-control ECU 1. The magnetic valve 10 is connected to the air tank 11 and the leveling valve 12 through tubes, and controls air supply to the leveling valve 12 by opening and closing. Between the magnetic valve 10 and the air tank 11, a protection valve 13 is provided to shut off the path when air leakage occurs.

The magnetic valve 10 is connected with two wires of a dump-signal line 1a and a return-signal line 1b of the vehicle-control ECU 1. The magnetic valve 10 switches into an open state by inputting the signal of the dump-signal line 1a, and switches into a closed state by inputting the signal of the return-signal line 1b.

This magnetic valve 10 is configured to memorize and maintain the current state. Specifically, the magnetic valve 10 maintains the open state during a period from inputting the signal of the dump-signal line 1a to inputting the signal of the return-signal line 1b. The magnetic valve 10 also maintains the closed state during a period from inputting the signal of the return-signal line 1b to inputting the signal of the dump-signal line 1a.

The magnetic valve 10 has a structure of maintaining the current state when the signal is not input from the dump-signal line 1a or the return-signal line 1b. This magnetic valve 10 does not require a standby current to maintain the open state or the closed state, and maintains the current state even if the engine key is turned to OFF position. As the magnetic valve 10, for example, a double-solenoid valve having a self-holding function can be used. The magnetic valve 10 is not limited to the double-solenoid valve, and various known structures having the above-described function can be used.

The leveling valve 12 is a valve configured to perform supply and discharge of air with respect to the air springs 14 and 15. The air springs 14 and 15 support the bed of the dump truck T. The leveling valve 12 is connected to the air tank 11 through the protection valve 13, and adjusts the height of the air springs 14 and 15 on the right and the left by supplying and discharging air fed from the air tank 11.

The leveling valve 12 adjusts the height of the air springs 14 and 15 to be in a normal mode. The normal mode is a mode in which the height of the air springs 14 and 15 are adjusted within a range in which the suspension function can be sufficiently secured, and is a basic mode considering travel of the dump truck T.

The leveling valve 12 is also connected to the magnetic valve 10 through the tube, and receives supply (pressure) of air from the magnetic valve 10 while the magnetic valve 10 is in the open state. The leveling valve 12 adjusts the air springs 14 and 15 to be in a dump mode by discharging air in the air springs 14 and 15 while receiving supply of air from the magnetic valve 10.

The dump mode is a stable mode in which air in the air springs 14 and 15 is sufficiently discharged, and is a mode in which the height of the air springs 14 and 15 is adjusted within a range suitable for loading/unloading the bed with a cargo. Herein, as the dump mode, air in the air springs 14 and 15 may be completely discharged so that the upper ends and the lower ends of the air springs mechanically abut each other. In this case, stability of the bed increases, which can effectively prevent the bed from wobbling during loading/unloading of a cargo, thereby improving convenience in loading/unloading of the cargo. As the structure of the leveling valve 12, various known structures may be used.

The leveling valve 12 and the magnetic valve 10 constitute the valve unit recited in the claims. The leveling valve 12 also corresponds to the discharge valve recited in the claims.

The following describes a control flow of the vehicle-control ECU 1 of the bed height adjustment system according to the present embodiment with reference to the drawings.

Figure 2:
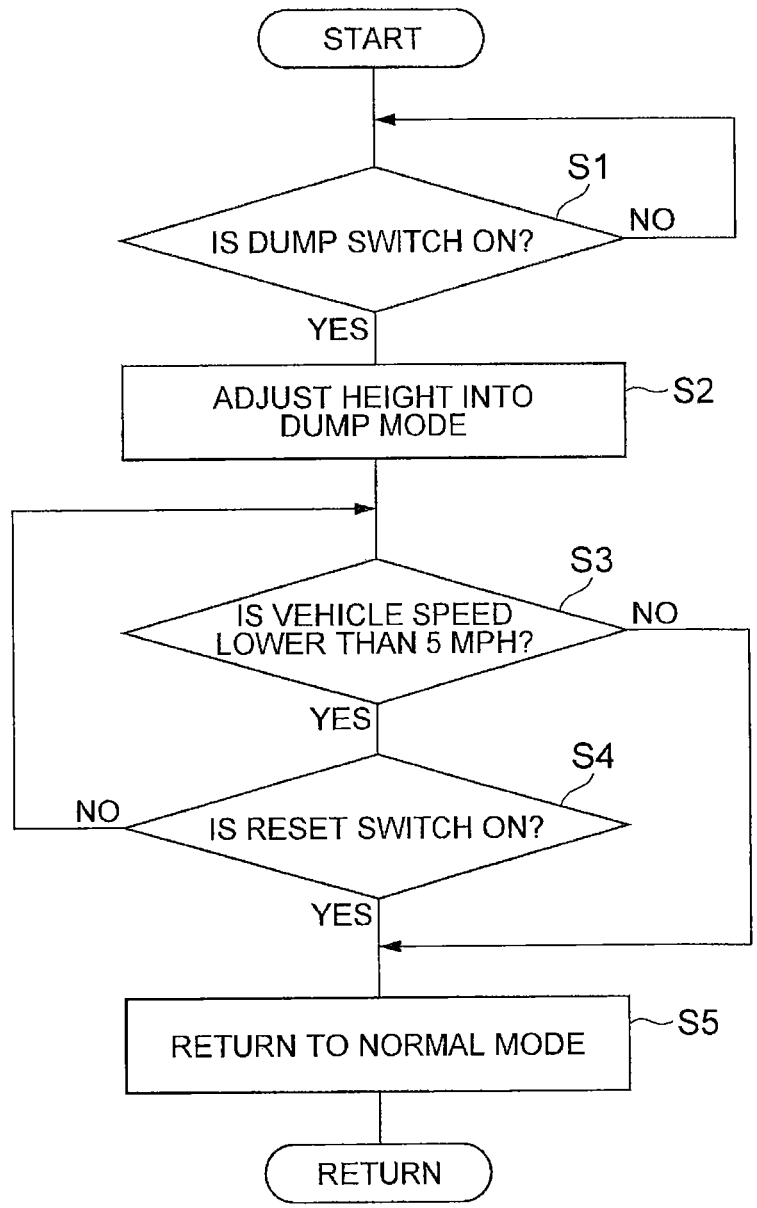
FIG. 2 is a flowchart illustrating a control flow of bed height adjustment in a vehicle-control ECU.

As depicted in FIG. 2, the vehicle-control ECU 1 determines at step S1 whether the dump-switch switching signal has been received. The vehicle-control ECU 1 repeats step S1 until determining that the driver has switched the dump switch 2 into the dump-switch ON state and the vehicle-control ECU 1 has received the dump-switch switching signal. If the vehicle-control ECU 1 determines that the vehicle-control ECU 1 has received the dump-switch switching signal, the process proceeds to step S2.

At step S2, the vehicle-control ECU 1 inputs a signal through the dump-signal line 1a connected to the magnetic valve 10. The magnetic valve 10 switches into the open state by inputting the signal of the dump-signal line 1a, and accordingly air is supplied to the leveling valve 12. The leveling valve 12 discharges air in the air springs 14 and 15 to adjust the height of the air springs 14 and 15 into the dump mode when air is supplied to the leveling valve 12 from the magnetic valve 10. The height of the bed is thus lowered, thereby stabilizing the bed and improving convenience in loading/unloading of the cargo. The vehicle-control ECU 1 then illuminates the indicator 4 in the cab.

At this time, in the bed height adjustment system, even if the engine key of the vehicle is turned to OFF position, the open state of the magnetic valve 10 is maintained, and thus the dump mode is maintained without the bed returning automatically.

Next, at step S3, based on the signal from the vehicle-speed sensor 3, the vehicle-control ECU 1 determines whether the vehicle speed of the dump truck T is equal to or higher than a predetermined speed (e.g., 5 MPH) or lower than the predetermined speed. If the vehicle-control ECU 1 determines that the vehicle speed of the dump truck T is equal to or higher than the predetermined speed, the process proceeds to step S5 described later. If the vehicle-control ECU 1 determines that the vehicle speed of the dump truck T is lower than the predetermined speed, the process proceeds to step S4.

At step S4, the vehicle-control ECU 1 determines whether ECU 1 has received the reset-switch switching signal. If the vehicle-control ECU 1 determines that ECU 1 has not received the reset-switch switching signal, the process returns to step S3 and the determination is repeated. If the vehicle-control ECU 1 determines that the driver has switched the dump switch 2 into the reset-switch ON state and the vehicle-control ECU 1 has received the reset-switch switching signal, the process proceeds to step S5.

At step S5, the vehicle-control ECU 1 inputs a signal through the return-signal line 1b connected to the magnetic valve 10. The magnetic valve 10 switches into the closed state by inputting the signal of the return-signal line 1b, so that the supply of air to the leveling valve 12 is stopped. When the air supply from the magnetic valve 10 is stopped, the leveling valve 12 supplies air to the air springs 14 and 15 to return the height of the air springs 14 and 15 into the normal mode. Subsequently, the process returns to step S1 again, and the vehicle-control ECU 1 repeats the determination.

The bed height adjustment system according to the present embodiment described above uses the vehicle-control ECU 1 for control of the height adjustment of the bed, thereby making it possible to achieve lower cost of the dump truck T than in a case of providing a relay used exclusively for the control. In addition, this bed height adjustment system is configured to adjust the height of the air springs 14 and 15 into two stages of the dump mode and the normal mode, which eliminates load of complicated control on the vehicle-control ECU 1, thereby making it possible to reduce memory usage of the vehicle-control ECU 1. Thus, the bed height adjustment system can be controlled also by using unused memory of the current vehicle-control ECU 1 without adding an expensive suspension electronic control ECU, leading to an advantage in cost reduction.

Furthermore, because this bed height adjustment system maintains the height of the air springs 14 and 15 in the dump mode or the normal mode when the signal is not input, loading/unloading of a cargo can be performed without returning automatically even when the driver pulls out the engine key. Thus, with this bed height adjustment system, because the driver can take a rest or do another operation after pulling out the engine key during loading/unloading of the cargo, convenience in loading/unloading of the cargo can be markedly improved.

In addition, this bed height adjustment system uses the magnetic valve 10 that can maintain the open state or the closed state when the signal is not input, and is switched between the dump mode and the normal mode by opening and closing the magnetic valve 10. This makes making it possible to improve convenience in loading/unloading of the cargo with relatively simple configuration.

Furthermore, this bed height adjustment system adjusts the height of the air springs 14 and 15 into the dump mode with the leveling valve 12 discharging air. Accordingly the number of parts can be reduced, whereby simpler system configuration and lower cost can be achieved than in a case of providing a discharge valve used exclusively for the dump mode.

In this bed height adjustment system, when the vehicle speed of the dump truck T is equal to or higher than the predetermined speed, the dump mode returns to the normal mode. Accordingly, the vehicle can be prevented from running at the predetermined speed or higher in the dump mode being maintained, and return to the normal mode can be achieved in which running stability is high. In this bed height adjustment system, because movement at a speed lower than the predetermined speed is allowed and the position of dump truck T can be adjusted in the dump mode being maintained, convenience in loading/unloading of the cargo can be improved.

In the foregoing, the preferred embodiments of the present invention have been described, but the present invention is not limited to the above-described embodiments.

For example, the configuration of the valve unit recited in the claims is not limited to that described above. Specifically, a cut valve (discharge valve) used exclusively for the dump mode may be provided between the leveling valve and the air springs. In this case, the magnetic valve is connected to the cut valve, the height of the air springs is controlled into the dump mode by supplying air from the magnetic valve for the cut valve to discharge air in the air springs. Alternatively, the function of maintaining the dump mode or the normal mode when the signal is not input may be implemented by combining, for example, valves that are differently configured.

An aspect of the present invention is not limited to the case of equipping the dump truck with the system, and may be used for a passenger vehicle or a special vehicle that includes a bed. The height adjustment of the bed includes lowering the height of the entire vehicle to adjust the height of the bed into the dump mode.

Furthermore, an aspect of the present invention may detect a state of a parking brake so as to be configured to switch the height of the bed into the dump mode when the parking brake is working. In this case, when the parking brake is released, the height of the bed may be automatically returned to the normal mode.

INDUSTRIAL APPLICABILITY

According to an aspect of the present invention, a bed height adjustment system can be provided that enables cost reduction by using a vehicle-control ECU instead of a relay and also can improve convenience in loading/unloading of a cargo.

REFERENCE SIGNS LIST

1 . . . vehicle-control ECU, 1a . . . dump-signal line, 1b . . . return-signal line, 2 . . . dump switch, 3 . . . vehicle-speed sensor, 4 . . . indicator, 10 . . . magnetic valve (valve unit), 11 . . . air tank, 12 . . . leveling valve (valve unit, discharge valve), 13 . . . protection valve, 14, 15 . . . air spring, T . . . dump truck

The invention claimed is:
1. A bed height adjustment system for adjusting height of a bed of a vehicle comprising:
   an air spring supporting the bed;
   a valve unit connected to an air tank and configured to adjust height of the air spring by supplying air to the air spring and discharging air from the air spring; and a vehicle-control ECU provided with a dump-signal line and a return-signal line each connected to the valve unit, wherein the valve unit adjusts the height of the air spring into a dump mode by inputting a signal of the dump-signal line, returns the height of the air spring into a normal mode by inputting a signal of the return-signal line, and maintains the dump mode or the normal mode when no signal is input.

2. The bed height adjustment system according to claim 1, wherein the valve unit comprises:

a magnetic valve connected to the air tank; and a discharge valve configured to adjust the height of the air spring into the dump mode by discharging air in the air spring during an open state of the magnetic valve, wherein the magnetic valve is connected to the dump-signal line and the return-signal line, and the magnetic valve switches into the open state by inputting the signal of the dump-signal line, switches into the closed state by inputting the signal of the return-signal line, and maintains the open state or the closed state when no signal is input.

3. The bed height adjustment system according to claim 2, wherein the discharge valve is connected to the air tank and configured as a leveling valve for adjusting the height of the air spring by supplying and discharging air.

4. The bed height adjustment system according to claim 1, further comprising a vehicle-speed sensor detecting vehicle speed of the vehicle, wherein the vehicle-control ECU inputs a signal to the return-signal line when the vehicle speed is equal to or higher than a predetermined speed.

5. The bed height adjustment system according to claim 2, further comprising a vehicle-speed sensor detecting vehicle speed of the vehicle, wherein the vehicle-control ECU inputs a signal to the return-signal line when the vehicle speed is equal to or higher than a predetermined speed.

6. The bed height adjustment system according to claim 3, further comprising a vehicle-speed sensor detecting vehicle speed of the vehicle, wherein the vehicle-control ECU inputs a signal to the return-signal line when the vehicle speed is equal to or higher than a predetermined speed.

* * * * *